May 17, 1960  S. T. DEAKIN  2,936,483
MANUFACTURE OF LENGTHS OF SYNTHETIC PLASTIC MATERIAL
Filed Dec. 14, 1954  3 Sheets-Sheet 3

INVENTOR
Stanley Thomas Deakin
ATTORNEYS

United States Patent Office 2,936,483
Patented May 17, 1960

2,936,483

MANUFACTURE OF LENGTHS OF SYNTHETIC PLASTIC MATERIAL

Stanley Thomas Deakin, Ewell West, England, assignor, by mesne assignments, to Siemens Edison Swan Limited, Westminster, London, England, a British company Application December 14, 1954, Serial No. 475,103

Claims priority, application Great Britain December 17, 1953

10 Claims. (Cl. 18—12)

This invention relates to the manufacture of lengths of synthetic plastic material.

The invention has an important application in the manufacture of strips, rods, tubes, cable coatings and the like of polytetrafluoroethylene, hereinafter referred to as P.T.F.E.

According to the present invention, a method of manufacturing lengths of synthetic plastic material comprises the steps of compressing unsintered loose material in successive stages in which the material is first compacted to render it coherent, then further compressed to form it to the desired shape, and finally sintering the compressed material.

The present invention also comprises a process of manufacturing lengths of synthetic plastic material consisting in the steps of compressing appropriate quantities of unsintered loose material so as to preform unit blocks, placing the preformed units end to end, applying pressure to cause the abutting ends to adhere, applying pressure to produce substantially the required cross-section, and applying suitable heat treatment to sinter the material. The loose material may be in the form of granules, coarse powder or flakes. The preforming is such as to cause the particles to adhere sufficiently to permit reasonable handling of the preformed unit blocks.

In carrying out the process the loose material may be continuously fed to a preforming chamber wherein it is periodically compressed to form short unit blocks of the material and the compressed unit is moved into abutment with the end of a previously preformed unit with sufficient pressure to cause the abutting surfaces to adhere.

In the case of a solid cross-section or a coating applied around a central core, for example an electrical conductor, the subsequent cross-sectional shaping may be effected by an externally applied pressure, while in the case of a hollow section, such as tubing, the pressure may be applied either internally against an external mandrel, or, alternatively, the pressure may be applied externally against an internal mandrel. In some cases both types of pressure may be applied in turn to the material.

The invention also comprises apparatus for carrying out the above process, including means for preforming unit lengths of loose material by compression, means for locating the preformed units end to end with sufficient pressure to cause them to adhere, means for applying intermittent or pulsating radial pressure to form a required cross-section, and means for applying a sintering heat to the formed material.

Preferably the preforming means comprises a ram movable along the direction of progression of the material to compress it against a yielding pressure member. The yielding pressure member may conveniently comprise a plurality of pivoting members arranged to swing sideways out of the way of the unit to permit the preformed unit to pass forwardly to a second compression chamber where the cross-sectional shaping is formed.

In order that the invention may be more clearly understood, reference will now be made to the accompanying drawings, in which.

Figure 1:
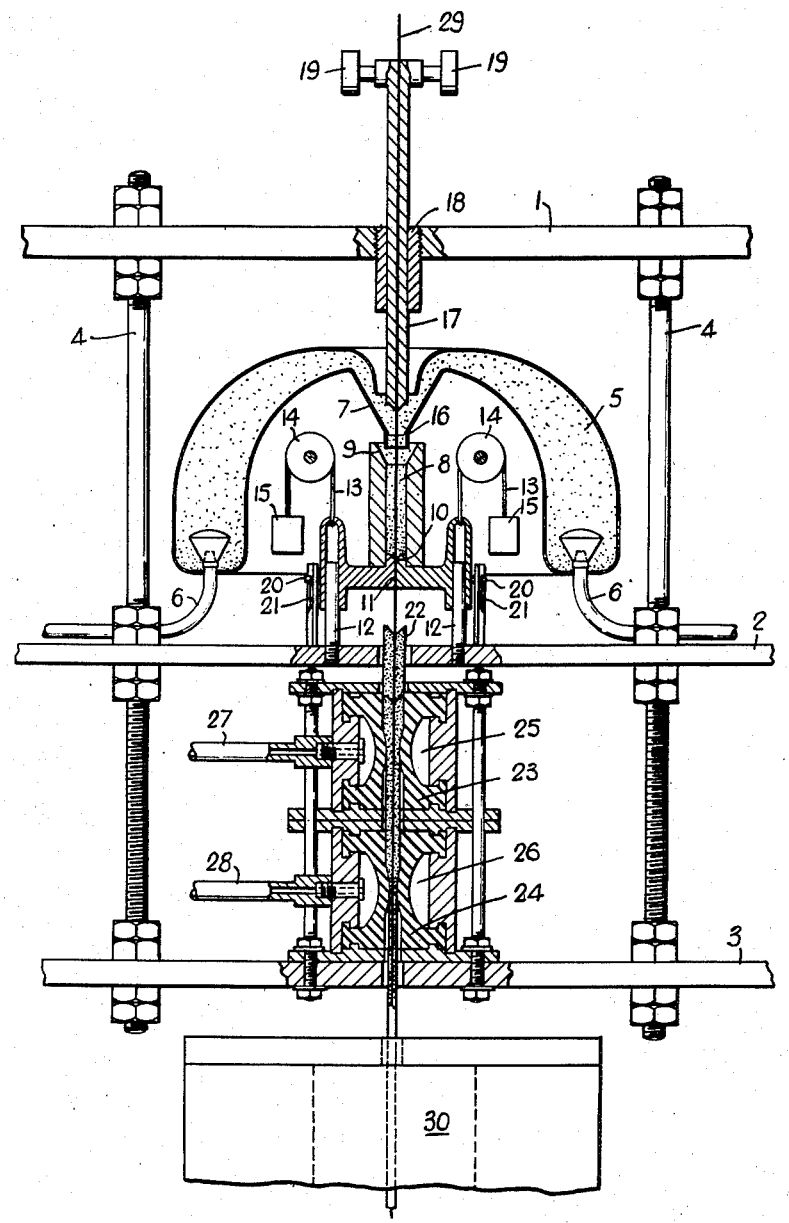
Fig. 1 shows diagrammatically in part section one form of apparatus for applying an insulating coating of P.T.F.E. around an electrical conductor.

Referring first to Fig. 1, the apparatus shown in carried on a framework consisting of horizontal cross-plates 1, 2, and 3, supported and spaced apart by vertical rods 4. The loose unsintered material is fed from a supply vessel 5 under the action of compressed air fed through pipes 6 into a hopper 7, the lower end of which discharges into the preforming chamber 8. The upper end of this chamber is formed with a conical entrance 9, whilst the lower end is closed by a boss 10 on a pressure member 11. This is vertically slidable on rods 12 carried on the cross-plate 2 and is supported by cables 13 passing over pulleys 14 and attached to weights 15.

The loose material falls through a central aperture 16 and the hopper 7 into the preforming chamber 8 and is periodically compressed by the ram 17 which is vertically slidable through a guide bush 18 mounted on the plate 1 and at the upper end carries rollers 19 which are adapted to be acted upon by a suitable cam mechanism, not shown, so as to move the ram vertically downwards and upwards. When pressed downwardly the ram passes down through the central aperture 16 of the hopper and compresses the material in the preforming chamber 8 against the boss 10 of the pressure member 11. As further pressure is applied by the ram the pressure member will be moved downwards against the biasing action of the weights 15. As will be described more particularly in connection with Figs. 2 and 4, the pressure member comprises two arms and as it is moved downwardly pins 20 riding in cam slots 21 cause the arms to pivot about the rods 12 so as to move sideways away from the preformed unit of material so that this may be pressed downwardly against the upper end of the previously preformed unit 22. The pressure against the unit 22 is sufficient to cause the ends of the two units to adhere, and this is assisted by chamfering the ends, the lower ends having protruding centres and the upper ends recessed centres as is clearly shown on the drawing.

The downward pressure of the ram will also move the material downwardly through annular resilient diaphragms 23 and 24. These diaphragms are formed with annular fluid spaces 25 and 26 respectively fed with air or liquid, for example oil, through supply pipes 27, 28, whereby a pulsating pressure is applied to the material, this pressure acting radially inwards and serving to reduce the cross-sectional shape of the material and further to compact it around the central electrical conductor 29. After this further compacting process the material passes through a heating chamber indicated by the reference 30, where it is sintered so as to consolidate it around the electrical conductor. It will be appreciated that in the arrangement shown the material will be progressed downwardly with an intermittent motion by the action of the ram 7.

The pressure applied in the chambers 25 and 26 may be at a high frequency, and in some cases it may be of a supersonic frequency. It will be observed that the wire 29 passes through the centre of the ram and the latter is so designed that it will slide easily over the wire without restriction, the wire being fed downwardly at the correct speed by the force exerted on it by the coating of P.T.F.E. which has been compacted around it at the lower end of the apparatus.

Figure 2:
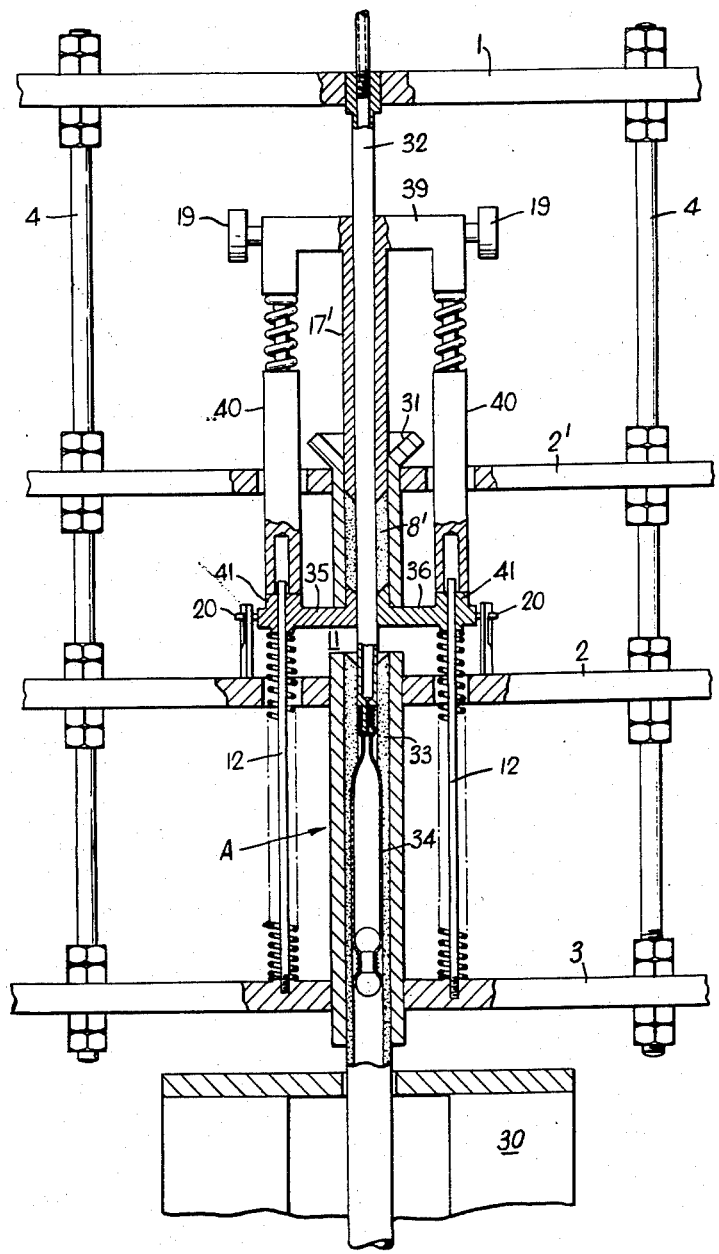
Fig. 2 shows a modified form of apparatus designed for producing tubing of P.T.F.E. or other plastic material.

Fig. 2 shows a modified form of apparatus designed for producing P.T.F.E. tubing. In this arrangement the preforming chamber 8' is formed with a funnel-shaped inlet 31 fed from a suitable hopper or other supply means, not shown in the drawing. The ram 17' is annular and slides over a vertical pipe 32 which extends downwardly through the preforming chamber into the end of an expanding chamber 33.

It will be appreciated that in this case the preformed unit is of hollow cylindrical shape and in this form it is pressed downwardly into the second pressure chamber 33 where pressure is applied internally by means of an expanding member such as a rubber container 34 to which air under pressure is fed through the vertical piping 32. This pressure again may be of a pulsating nature, for example of supersonic frequency, and serves to press the hollow cylinder of material outwardly against the wall of the second pressure chamber 33. After the compressing action in the chamber 33 the material is fed downwardly through the heating chamber 30.

Figure 3:
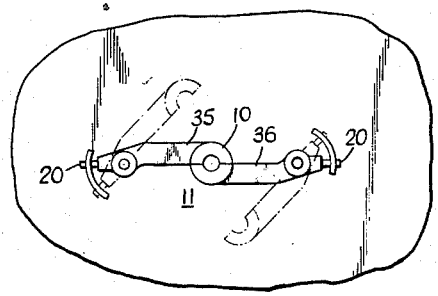
Fig. 3 is a section on the line III—III of Fig. 1; whilst
Figure 4:
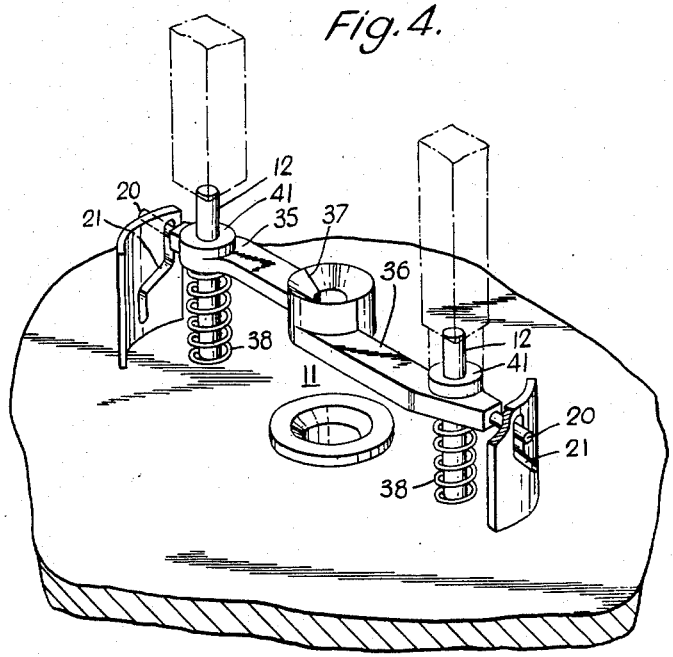
Fig. 4 is an enlarged perspective view of the apparatus illustrated in Fig. 3.

Referring now to Figs. 3 and 4, it will be observed that the pressure member comprises a pair of vertically pivoted arms 35 and 36 which abut together along a vertical face 37. When these arms are pressed downwardly against the action of the biasing springs 38 which replace the weights 15 in the Fig. 1 arrangement, it will be readily appreciated that the pins 20 and the cams 21 will cause the arms 35 and 36 to rotate respectively counterclockwise and clockwise about the pins 12; thus they will fly apart into the positions shown chain-dotted in Fig. 3 and allow the precompressed unit block of P.T.F.E. to pass downwardly between them.

Referring again to Fig. 2, it will be observed that the ram 17' is carried on a cross-arm 39 on which are mounted the cam-actuated rollers 19; the cross-arm 39 has a pair of downwardly extending arms 40 which abut against bosses 41 (Fig. 4) on the arms 35 and 36. During filling of the pressure chamber the ram will be raised appreciably above the position shown in Fig. 2. It will then be pressed downwardly so as to compress the material in the preforming chamber, and this pressure will continue until the lower ends of the vertical arms 40 abut against the bosses 41 on the arms 35 and 36 in the position shown in Fig. 2. When this happens the pressure member 11 will be moved downwardly so that the arms 35 and 36 will open and the preformed unit block can move down between the open arms until it abuts against the previously formed unit block shown located in the upper end of the second pressure chamber 33. This arrangement ensures that the arms 35 and 36 will stay apart whilst the preformed unit block is moved down between them, i.e. the arms will not rub against the sides of the block.

In order to permit sufficient downward movement of the ram, the vertical arms 40 are formed with telescopic sections 40 and 42 held apart by compression springs 43. This allows the ram to continue to move downwardly after the springs 38 have been fully compressed. It will, of course, be appreciated that the springs 43 must be stronger than the springs 38 to ensure that the springs 43 are not compressed before the springs 38 are compressed.

What I claim is:

1. The method of manufacturing lengths of electrical conductor coated with polytetrafluoroethylene, comprising the steps of feeding unsintered loose dry polytetrafluoroethylene material into a preforming chamber, periodically cold compressing said dry loose material to form a short unit block around a central core of the wire to be coated, moving the compressed unit block from the pre-forming chamber into abutment with the end of a previously preformed unit block on the wire with sufficient axial pressure to cause the abutting surfaces to adhere, applying an external essentially transverse pressure to the length of coherent unit blocks to further compact said material and form the desired cross-section around the central core of the wire, and sintering the shaped material to consolidate it upon said wire.

2. The method of manufacturing lengths of polytetrafluoroethylene in the form of a hollow section, comprising the steps of feeding unsintered loose dry polytetrafluoroethylene material into a preforming chamber, periodically compressing said loose material around a central mandrel to form a short unit hollow block, moving the compressed unit block from the preforming chamber into abutment with the end of a previously preformed unit block with sufficient pressure to cause the abutting surfaces to adhere, externally applying pressure to produce the required hollow cross-section against an internal mandrel, and sintering the shaped material.

3. The method of manufacturing lengths of hollow tubing of polytetrafluoroethylene comprising the steps of feeding unsintered loose dry polytetrafluoroethylene material into a preforming chamber, periodically compressing said loose material around a central mandrel to form a short unit block, moving the compressed unit block into abutment with a previously preformed unit block from the pre-forming chamber with sufficient pressure to cause the abutting surfaces to adhere, internally applying pressure against an external mandrel so as to produce a tube of the required cross-section, and sintering the shaped material.

4. The method of manufacturing lengths of polytetrafluoroethylene comprising the steps of feeding polytetrafluoroethylene in the form of unsintered dry loose material into a pre-forming chamber, periodically cold compressing said material by longitudinal pressure to form a short unit block, moving the compressed unit block into abutment with the end of a previously formed unit block with sufficient pressure to cause the abutting surfaces to adhere, applying a radial vibrating pressure to the length of cohered unit blocks to form it to the desired cross section, and sintering the shaped material.

5. The method of manufacturing tubular lengths of polytetrafluoroethylene comprising the steps of feeding unsintered loose material into a pre-forming chamber, periodically cold compressing said loose material about a central mandrel to form a short pre-formed unit block, moving the compressed unit block into abutment with a previously formed unit block with sufficient pressure to cause the abutting surfaces to adhere, internally applying a vibrating pressure outwardly against an external wall to produce an output of the required cross section, and sintering the shaped material.

6. Apparatus for manufacturing lengths of synthetic plastic material, comprising means for feeding unsintered loose material into a pre-forming chamber, a ram movable along the direction of progression of material in said chamber to cold compress the loose material longitudinally against a yielding pressure member to preform unit blocks, means for locating the pre-formed blocks end to end for abutment with sufficient pressure to cause abutting faces of the blocks to adhere a passage to said blocks, a flexible wall to said passage, means for moving the blocks past said flexible wall, means for vibrating said wall to apply lateral pulsating pressure to the blocks to form them to the required cross-section, and means for applying a sintering heat to the formed material.

7. Apparatus for manufacturing lengths of synthetic plastic material, comprising means for feeding unsintered loose material into a pre-forming chamber, a ram movable along the direction of progression of the material in said chamber and adapted to compress said loose material longitudinally against a yielding pressure member to pre-form unit blocks, means for withdrawing said pressure member laterally from the path of the material after a block has been pre-formed, means for locating pre-formed blocks end to end for abutment with sufficient pressure to cause abutting faces of the blocks to adhere a passage to said blocks, a flexible wall to said passage, means for moving the blocks past said flexible wall means for vibrating said flexible wall to apply lateral pulsating pressure to form the blocks to the required cross-section, and means for applying a sintering heat to the formed material.

8. Apparatus for manufacturing lengths of synthetic plastic material, comprising means for feeding unsintered loose material into a pre-forming chamber, a ram movable along the direction of progression of material in said chamber and adapted to cold compress the loose material longitudinally against a yielding pressure member to pre-form unit blocks, means for locating the preformed blocks end to end for abutment with sufficient pressure to cause abutting faces of the blocks to adhere, a shaping chamber of circular cross-section, a flexible wall to said chamber, means for passing the preformed blocks through said chamber, means for vibrating said flexible wall radially to apply radial pulsating pressure to said preformed blocks, and means for applying a sintering heat to the formed material.

9. Apparatus for manufacturing lengths of synthetic plastic material, comprising means for feeding unsintered loose material into a pre-forming chamber, a ram movable along the direction of progression of material in said chamber to compress the loose material longitudinally against a yielding pressure member to form unit blocks, means for locating the preformed blocks end to end for abutment, by movement of the ram, with sufficient pressure to cause abutting faces of the blocks to adhere, a shaping chamber of circular cross-section, a rigid external wall to said chamber, a hollow flexible member forming a mandrel in said chamber, means for passing the preformed blocks through an annular space between the mandrel and said rigid wall, means for applying fluid pressure to vibrate said mandrel radially to apply pulsating radial pressure to the preformed blocks, and means for applying a sintering heat to the formed material.

10. In a method of manufacturing continuous tubular lengths of polytetrafluoroethylene having a central bore, the steps comprising feeding a series of successive measured amounts of unsintered flocculent dry polytetrafluoroethylene into a preforming chamber; successively compressing the measured amounts of flocculent polytetrafluoroethylene around a central mandrel to successively form a series of individual short coherent hollow blocks of compacted cylindrical form; transferring each of said hollow blocks prior to the feeding of a subsequent measured amount of flocculent polytetrafluoroethylene from said preforming chamber into end-to-end abutment with the exposed end of a previously formed block of said successive series with an axial force sufficient to cause the abutting surfaces to adhere whereby to form a single continuous coherent length of compacted polytetrafluoroethylene from said successively formed series of blocks by the successive adherence of each of said blocks to the exposed end of the formed continuous length of polytetrafluoroethylene, externally applying pressure to produce the required cross section of said continuous length of polytetrafluoroethylene and sintering the continuous length of polytetrafluoroethylene.

References Cited in the file of this patent

UNITED STATES PATENTS

| | | |
|---|---|---|
| 1,857,791 | Peiler | May 2, 1932 |
| 2,097,502 | Southgate | Nov. 2, 1937 |
| 2,249,085 | Lange | July 15, 1941 |
| 2,289,787 | Kaschke et al. | July 14, 1942 |
| 2,389,178 | Blount et al. | Nov. 20, 1945 |
| 2,447,434 | Schwarzkopf | Aug. 17, 1948 |
| 2,456,262 | Fields | Dec. 14, 1948 |
| 2,456,621 | Cheney | Dec. 21, 1948 |
| 2,485,691 | Bogese | Oct. 25, 1949 |
| 2,529,066 | Annas | Nov. 7, 1950 |
| 2,651,952 | Leavenworth | Sept. 15, 1953 |
| 2,708,770 | Herres et al. | May 24, 1955 |
| 2,752,321 | Heller | June 26, 1956 |
| 2,752,637 | Walker et al. | July 3, 1956 |
| 2,765,153 | Gielow et al. | Oct. 2, 1956 |